Figure 1:
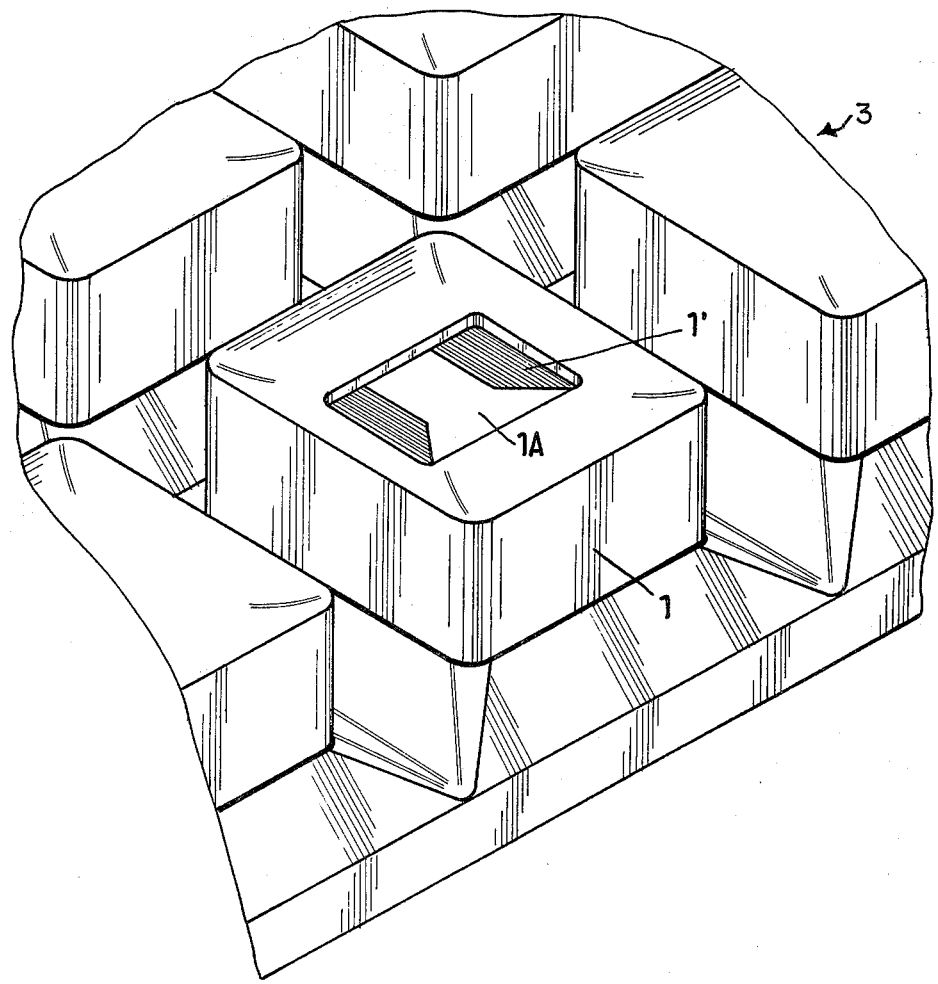

United States Patent [19]
Warnecke et al.

[11] 4,352,959
[45] Oct. 5, 1982

[54] DEVICE FOR VISUAL DISPLAY OF TELEPHONE OPERATION SYMBOLS

[75] Inventors: Gunter Warnecke; Gerhard Schiller, both of Berlin, Fed. Rep. of Germany

[73] Assignee: Krone GmbH, Berlin, Fed. Rep. of Germany

[21] Appl. No.: 208,644

[22] Filed: Nov. 20, 1980

[30] Foreign Application Priority Data

Dec. 8, 1979 [DE] Fed. Rep. of Germany ....... 2949449

[51] Int. Cl.³ ............................................. H04M 1/23
[52] U.S. Cl. .............................. 179/90 K; 179/81 C; 179/84 L; 340/365 VL; 340/712
[58] Field of Search ............. 179/99 LS, 90 K, 90 L, 179/84 L, 2 TC; 340/365 VL, 712, 784

[56] References Cited

U.S. PATENT DOCUMENTS 3,943,288  3/1976  Reed et al. ...................... 179/2 TC
4,046,972  9/1977  Huizinga et al. ................. 179/84 L
4,078,257  3/1978  Bagley ............................ 340/712
4,169,217  9/1979  Szanto et al. .................... 179/81 C

FOREIGN PATENT DOCUMENTS 1219528   1/1967   Fed. Rep. of Germany .
2054318   3/1972   Fed. Rep. of Germany .
2318185  10/1974   Fed. Rep. of Germany .
2019628  10/1979   United Kingdom ................ 340/712

Primary Examiner—Gerald L. Brigance
Attorney, Agent, or Firm—Brown & Martin

[57] ABSTRACT

In accordance with the invention there is provided a display device for visual display of telephone operation symbols in telecommunication apparatus which includes, for example, a key-dialing block. The device has a display element incorporated in a key-dialing block and an electronic circuit controlling the display element. The device is such as to provide a visual display showing a first symbol when one telephone set in a two set circuit is in use while displaying a second symbol when a number is dialed with the receiver replaced.

4 Claims, 4 Drawing Figures

DEVICE FOR VISUAL DISPLAY OF TELEPHONE OPERATION SYMBOLS

This invention relates to a device for visual display of telephone operation symbols in telecommunication apparatus such as, for example, key-dialling blocks or pads.

It is the aim of the present invention to provide a device which, when a second, or extension set is in use in a two-set circuit, displays a clearly visible optical symbol in the first, or main, telephone set and also provides a visual indication during dialling with the receiver replaced, thus clearly identifying the operative condition of the set at any time to the user, and wherein the display element is fully integrated in the key-dialling block.

In accordance with the invention there is provided a display device for visual display of telephone operation symbols in telecommunication apparatus such as, for example key-dialling blocks, characterised by the provision of a display element incorporated in a key-dialling block and of an electronic circuit controlling said display element, the arrangement being such as to provide a visual display showing a first symbol when one telephone set in a two-set circuit is in use, while displaying a second symbol when a number is dialled with the receiver replaced.

Figure 2A:
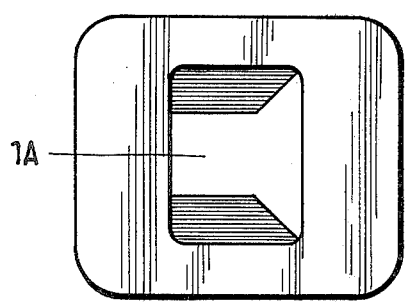
Figure 2B:
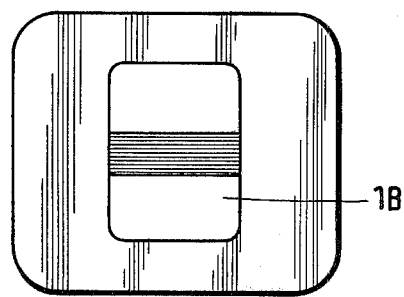
Figure 3:
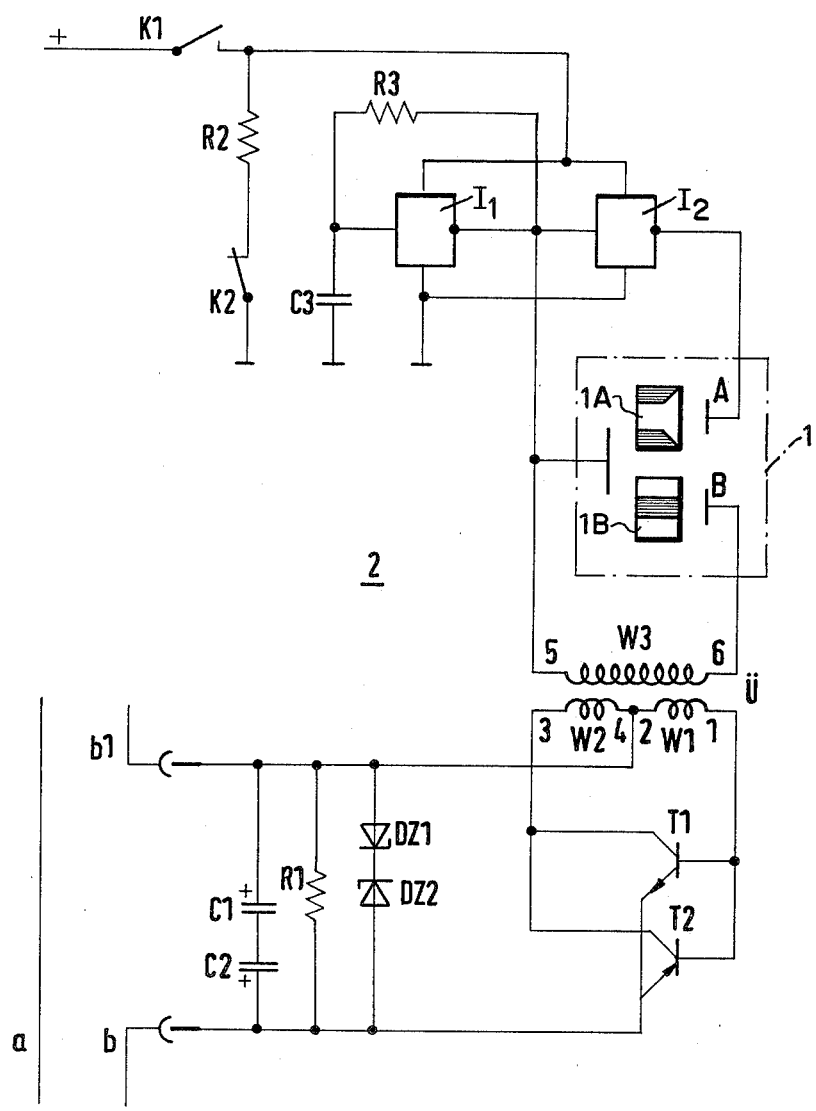

An embodiment of the invention is illustrated by way of example in the accompanying drawings wherein:

FIG. 1 shows a liquid crystal display element as incorporated within a key-dialling block, FIGS. 2A and 2B show two visual display symbols (bar and loudspeaker) and FIG. 3 shows a symbol-display activating circuit.

As shown in FIG. 1, a liquid crystal display element 1 is arranged in a key-dialling block or pad 3. The display element 1 has a key-shape and is adapted to be fitted in the key-pad dialling block 3.

The display element 1 is a liquid crystal device and has electrodes shaped to enable its display 1 to provide two different symbols as shown in FIG. 2. A bar symbol 1B is displayed whenever the second set or extension set of a two-set circuit is in use. A loudspeaker symbol 1A is displayed whenever dialling is carried out with the receiver in place on its cradle (i.e. in loudspeaker or free-speaking operation).

FIG. 3 shows the circuit by means of which the display element 1 is driven. For the bar symbol 1B, the current flowing in the wires a, b connecting the set to the extension set or second set is detected and this enables an oscillator driving the electrode B associated with the bar symbol. To this end the wire b is interrupted and the connection is completed by a series resistor $R_1$. Since direct current flow in resistor $R_1$ may be in either direction, two mutually reversed zener diodes DZ1 and DZ2 are connected in series across the resistor $R_1$ and two mutually reversed electrolytic capacitors $C_1$ and $C_2$ are similarly connected in series across the resistor $R_1$. The zener diodes limit the voltage across the resistor $R_1$ and the capacitors smooth this voltage, i.e. they prevent any a.c. component in the current flow from appearing across resistor $R_1$.

The oscillator referred to above comprises a transformer U and two transistors $T_1$ and $T_2$ which are npn and pnp types respectively. The emitters of these transistors are connected together and also connected to one end of the resistor $R_1$. The collectors of the two transistors are also connected together and are connected via a primary winding $W_2$ of the transformer U to the other end of the resistor $R_1$. The bases of the two transistors are likewise connected together and are connected via a feedback winding $W_1$ of the transformer U to said other end of the resistor $R_1$. The windings $W_1$ and $W_2$ are wound so that when either transistor $T_1$ and $T_2$ is turned on (depending on the polarity of the supply) and current in winding $W_2$ is increasing, the feedback winding $W_1$ applies to the base of that transistor a positive feedback signal. When the transformer core saturates this feedback disappears so that the transistor in question starts to turn off and the positive feedback then causes the transistor to turn right off. The time constants of the oscillator which is of a well known type, are determined by the ohmic resistances of the primary and feedback windings themselves.

The transformer U also has a secondary winding $W_3$ connected between the common electrode and the electrode B of the display element 1. The bar symbol 1B is thus displayed whenever the oscillator constituted by the transformer U and transistor $T_1$ and $T_2$ is running.

Control of the display of the loudspeaker symbol 1A is exercised by contacts $K_1$ and $K_2$ which are operated by another key (not shown) in the key-pad 3, which is actuated when it is required to dial a number with the receiver replaced on its cradle. Contact $K_1$, is a normally open contact which connects an internal stabilized voltage supply to one end of a resistor $R_2$. The other end of the resistor $R_2$ is connected by the contact $K_2$ (which is normally closed) to the earth return of this supply. Said one end of the resistor $R_2$ is connected to the supply terminals of two logic inverter circuits $I_1$ and $I_2$ which are connected to operate as an oscillator. To this end a resistor $R_3$ and a capacitor $C_3$ are connected in series between the output of inverter $I_1$ and the earth return, the junction of resistor $R_3$ and capacitor $C_3$ being connected to the input of inverter $I_1$. Inverter $I_2$ has its input connected to the output of inverter $I_1$. The output of inverter $I_1$ and the input of inverter $I_2$ are connected to the common electrode of display element 1, and the output of inverter $I_2$ is connected to electrode A of the display element. Both inverters have an earth return connection.

Thus, whenever contacts $K_1$ and $K_2$ are actuated the inverters $I_1$ and $I_2$ are supplied with power and the oscillatory signals thus generated cause the loudspeaker symbol to be displayed by display element 1.

We claim:
1. A device for visual display of telephone operation symbols in telecommunication apparatus comprising a two-set installation having a free-speaking or loudspeaker option permitting dialing with the receiver replaced, said device comprising:
   a key-dialing block having a plurality of keys thereon;
   a liquid crystal display element incorporated in said key-dialing block in the form of one of said keys; and
   an electronic circuit coupled to said display element for control thereof, said circuit also being coupled to said key-dialing block and said telephone sets;
   whereby under control of said circuit, said display element shows a first symbol when one of said telephone sets is in use, and shows a second symbol when said key-dialing block is employed to dial a number with the receiver replaced, said circuit comprising:
   an oscillator coupled to said display element; and means responsive to current flow in said one telephone set for enabling said oscillator, thereby energizing said display element to provide said first symbol.

2. A device as claimed in claim 1 in which said means responsive to current flow is a resistor through which said current flows when said one telephone set is in use, and capacitor means connected across said resistor, said oscillator comprising a transformer and at least one transistor connected to said transformer and to said capacitor means, and circuit means energizing said display from said transformer.

3. Apparatus according to claim 2 in which said oscillator includes two complementary transistors connected to said transformer in a circuit which oscillates for either direction of current flow through said resistor.

4. A device as claimed in claim 1 or 2 in which contacts are provided which are actuated when dialling with the receiver replaced is to be effected, said contacts controlling the supply of power from a stabilised supply to a logic inverter oscillator connected to the display to energise said second symbol.

* * * * *